Jan. 7, 1947.　　　B. A. SWENNES　　　2,413,850
AMPHIBIAN VEHICLE
Filed Jan. 12, 1944　　　2 Sheets-Sheet 1
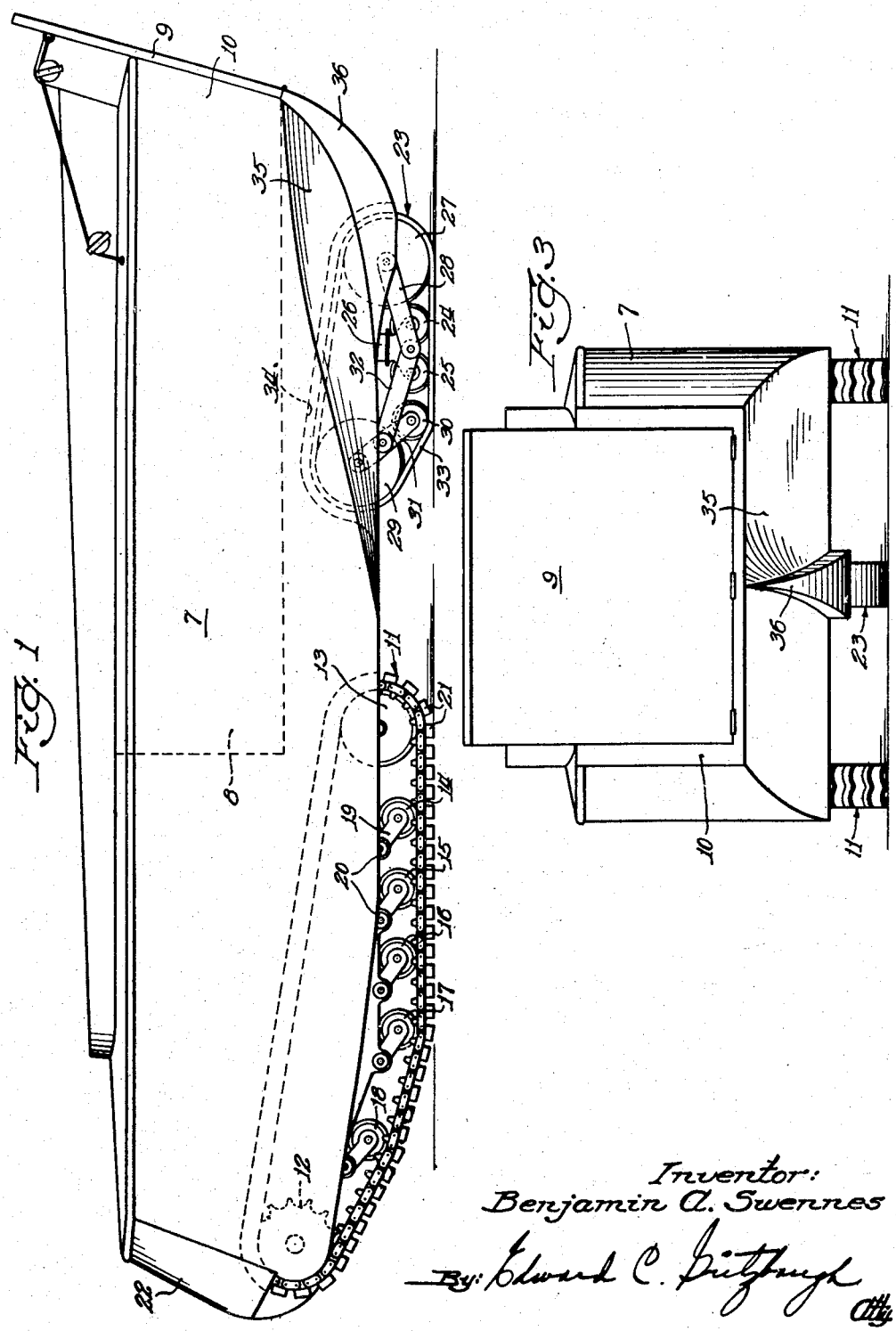
Inventor:
Benjamin A. Swennes Jan. 7, 1947.	B. A. SWENNES	2,413,850
AMPHIBIAN VEHICLE
Filed Jan. 12, 1944	2 Sheets-Sheet 2
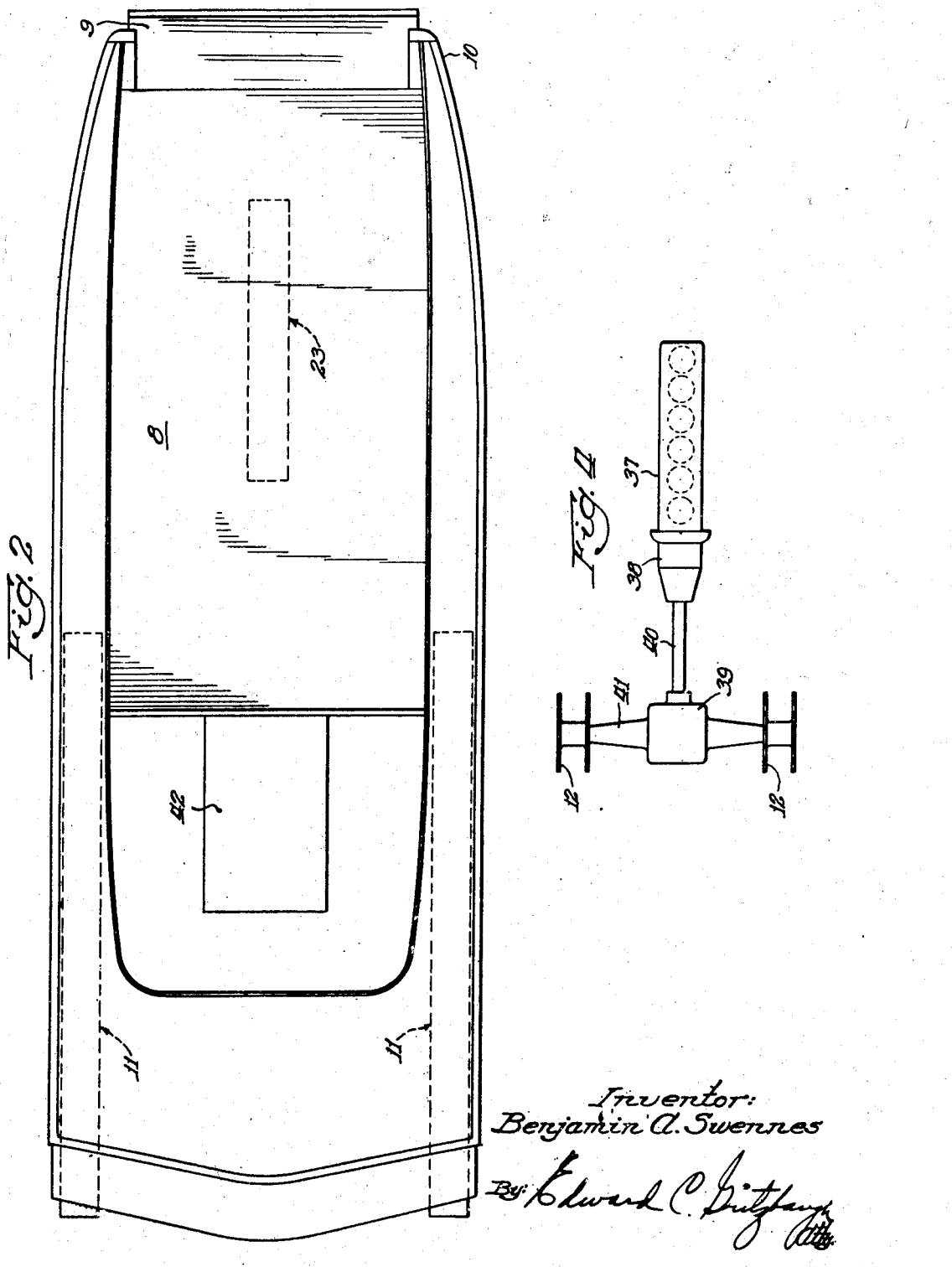
Inventor:
Benjamin A. Swennes
By Edward C. Gritzbaugh
Atty.

Patented Jan. 7, 1947

2,413,850

UNITED STATES PATENT OFFICE 2,413,850

AMPHIBIAN VEHICLE

Benjamin A. Swennes, Rockford, Ill., assignor to Borg-Warner Corporation, Chicago, Ill., a corporation of Illinois Application January 12, 1944, Serial No. 517,940

15 Claims. (Cl. 115—1)

My invention relates to amphibian vehicles, and more particularly to such vehicles having movable tracks on their exteriors which are adapted to propel the vehicles either over land or through the water.

Amphibian vehicles having tracks on their exteriors adapted for propelling the vehicles over land or through the water have heretofore been used. The traction between the tracks and the water was provided by lugs fixed to the tracks. The ends of these vehicles were preferably plane surfaces which slanted upwardly and endwardly of the vehicles so that theoretically these vehicles would tend to move over the surface of the water with a minimum of drag. It has been found with such a vehicle, however, that its slanted ends were not really streamlined with respect to the water and that the vehicle tended to push the water ahead of it, and there was a substantial drag on the vehicle due to this action. The vehicle functioned in this manner instead of skimming over the water due to its great weight and slow speed.

It is one of the objects of my invention to provide an improved tracked amphibian vehicle which has a streamlined end and more particularly a tapered end for reducing the effect of the vehicle in pushing the water ahead of it and which would allow the vehicle to cut the water, whereby the drag on the vehicle is decreased and its speed is increased.

The amphibian vehicles heretofore used have been provided with propelling tracks extending substantially the whole length of the vehicle. The tracks were thus of considerable length and weight, and due to their inertia, considerable power was required to start and stop the tracks. It is a further object of my invention to provide an improved amphibian vehicle utilizing tracks which extend for only a portion of the length of the vehicle and which thus are of less length and weight and require considerably less power to start and stop. It is also an object to position these tracks of shorter length adjacent the end of the vehicle opposite a tapered end thereof, whereby the tracks do not interfere with the cutting through the water by the vehicle, and it is a further object to provide an auxiliary wheeled supporting unit adjacent the streamlined end of the vehicle for supporting this end of the vehicle when the vehicle is on land.

It is another object of my invention to provide such an amphibian vehicle having a streamlined end to cut through the water which is so constructed as to facilely travel in the opposite direction over land and to mount on and pass over obstacles of substantial height. It is thus an object to provide, adjacent the end of the vehicle opposite its streamlined end, portions of tracks on opposite sides of the vehicle which extend upwardly and endwardly of the vehicle to effect passage of the vehicle over obstacles.

It is still another object of my invention to provide a power transmission system in such a tracked amphibian vehicle which functions to selectively give one speed ratio for driving the tracks in one direction for propelling the vehicle through the water with its streamlined end foremost and to give a plurality of speed ratios for driving the tracks and for propelling the vehicle over land in the opposite directions.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a side elevational view of an amphibian vehicle embodying the principles of the invention;

Fig. 2 is a plan view of the amphibian vehicle;

Fig. 3 is an end elevational view of the amphibian vehicle; and

Fig. 4 is a diagrammatic view of the driving mechanism for the tracks of the amphibian vehicle.

Like characters of reference designate like parts in the several views.

Referring now to the drawings, the illustrated amphibian vehicle comprises a vehicle body 7 which is substantially water-tight. The body 7 is provided with a cargo space 8 therein, and a gate 9 is hingedly mounted on an end 10 of the body for providing access to the cargo space. The gate 9 may be raised or lowered by any suitable means, and the gate when lowered is adapted to be used as a ramp for moving cargo into the cargo space.

An articulated track 11 is disposed on each side of the vehicle body 7. Each of the tracks 11 is held in looped configuration and is movably disposed with respect to the body 7 by means of a sprocket wheel 12, an idler wheel 13 and bogie wheels 14, 15, 16, 17 and 18. The sprocket wheel 12 is journaled in the vehicle body 7 and is driven by mechanism hereinafter to be described, and the idler wheel is yieldingly supported with respect to the body 7 by any suitable means (not shown). The bogie wheels 14 to 18 are each individually yieldingly mounted with respect to the vehicle body 7 by an arm 19 connected with the body 7 by means of a yieldable torsion assembly 20 of any suitable construction. The articulated tracks 11 are provided with lugs 21 thereon which function to provide traction between the tracks and the water when the vehicle is in water. The tracks 11 are disposed adjacent the end 22 of the body 7, and the tracks support this end of the body when the vehicle is on land. The lugs 21 function also to provide traction between the ground and the tracks, when the vehicle is on land, as is apparent.

An auxiliary wheeled, body supporting unit 23 is provided for supporting the end 10 of the body 7. This unit comprises idler wheels 24 and 25 rotatably mounted with respect to a member 26 which is yieldably connected to the body 7 by any suitable means (not shown). A large idler wheel 27 is connected with the member 26 by means of a link 28, and an idler wheel 29 of the same size as the wheel 27 and an idler wheel 30 of the same size as the wheels 24 and 25 are connected with the member 26 by means of links 31 and 32, as shown. A track 33 is disposed in looped configuration about the idler wheels and moves about the wheels. It will be noted that the unit 23 is partially disposed in a cavity 34 provided in the bottom of the body 7 adjacent the body end 10, and the unit 23 functions to support this end of the vehicle with the track 33 being in contact with the ground when the vehic'e is on land.

The body 7 on its bottom adjacent the end 10 of the body is provided with surfaces 35 which slant upwardly toward this end of the body and also sidewardly from the longitudinal center of the body. The body 7 is thus streamlined and tapered on this end so that the body cuts the water as it passes therethrough with this end foremost. A pointed keel 36 is provided on this end of the body in its longitudinal center and endwardly of the auxiliary supporting unit 23. This keel functions to streamline the body 7 about the supporting unit 23 and minimize the drag of water on the unit 23.

It will be observed that each of the tracks 11 has a portion or stretch between the bogie wheel 17 and the sprocket wheel 12 which extends upwardly and endwardly of the vehicle. When the tracks 11 are driven so as to propel the vehicle with its end 22 foremost, these stretches of track tend to run onto any obstacle the vehicle may encounter, and the vehicle thereby mounts on and moves across the obstacle.

The driving mechanism for the tracks 11 includes a motor 37 (see Fig. 4) having in tandem therewith a transmission 38 which in turn is connected with a controlled differential transmission 39 by means of shafting 40. The transmission 39 is connected to drive the sprockets 12 for the tracks on opposite sides of the vehicle by means of suitable shafting 41. The motor 37 may be of any suitable type and is preferably an internal combustion engine. The transmission 38 may be controlled by any suitable means (not shown) and preferably provides one speed ratio in one direction and a plurality of speed ratios in the opposite direction. The arrangement of the various parts of the driving mechanism is such that the tracks 11 are driven in the single speed ratio in a direction to propel the vehicle body 7 with its streamlined end 10 foremost, and this speed ratio is intended for use as a reverse on land or for use as forward in the water. The plurality of speed ratios are available for driving the tracks in the opposite direction to propel the vehicle with its opposite end 22 foremost, and these speeds are intended for use primarily on land. The transmission 38 preferably is automatic in shifting between the plurality of speed ratios for driving the tracks 11 in the direction for propelling the vehicle with its end 22 foremost. The differential transmission 39 may be of any suitable construction so that either one of the sprockets 12 may be decreased in speed with respect to the other sprocket at the will of the operator, in order that the vehicle may be turned in one direction or the other. The track driving mechanism may be suitably disposed in the body 7 adjacent the end 22 of the vehicle with the motor 37 being in the motor box 42 which is shown in Fig. 2.

The vehicle illustrated is particularly suited to be operated in one direction in water and in the other direction on land, although it will be apparent that, if desired, the vehicle may be operated in both directions either on land or in water. When the vehicle is in water, the transmission 38 is preferably shifted to drive the tracks 11 so as to propel the vehicle with its tapered end 10 foremost. With the vehicle moving through the water in this direction, the tapered end 10 comprising the slanting surfaces 35 functions to cut the water and make facile the movement of the body in this direction through the water. The keel 36 functions to reduce the drag of the auxiliary supporting unit 23, as is apparent. Any of the speed ratios of the transmission 38 for driving the tracks 11 in the opposite direction may be utilized for reversing the vehicle in the water, as is apparent. When the vehicle is operated on land, it is preferably run in the opposite direction with its end 22 foremost, and the one of the plurality of speed ratios of transmission 38 at which the best operation is obtained for the particular kind of terrain being traversed may be used. With the vehicle moving in this direction over land, the upwardly extending stretches of tracks between the bogie wheels 17 and the sprockets 12 function such that the vehicle may mount and pass over obstacles. The single speed ratio of the transmission 38 in the opposite direction may be utilized for reversing the vehicle on land, as is apparent. When the vehicle is being driven from land to water, the end 10 of the vehicle is preferably driven into the water first so that the tracks 11 contact ground as long as possible. When the vehicle is being beached, the end 22 of the vehicle is preferably driven foremost onto the beach so that the tracks 11 contact ground as soon as possible.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. An amphibian vehicle comprising in combination, a substantially water-tight body, a pair of tracks movably disposed on opposite sides of said body and adapted to propel the vehicle either over land or through the water, said tracks extending for only a portion of the length of the body and being disposed adjacent an end of the body, and an auxiliary body supporting means relatively movable with respect to the body and disposed adjacent its opposite end and functioning with the tracks to support the body when the vehicle is propelled over land.

2. An amphibian vehicle comprising in combination, a substantially water-tight vehicle body, said body on one end thereof being streamlined for facilitating passage of the vehicle through the water with this end foremost, a pair of tracks movably disposed on opposite sides of said body and adapted to propel the vehicle either over land or through the water, said tracks extending for only a portion of the length of the body and being disposed adjacent the opposite end of the body, and auxiliary wheeled supporting means for said body adjacent its streamlined end functioning with said tracks to support the body when the vehicle is propelled over land.

3. An amphibian vehicle comprising in combination, a substantially water-tight vehicle body, said body on one end thereof being streamlined for facilitating passage of the vehicle through the water with this end foremost, a pair of tracks on opposite sides of said body, said tracks each being movably disposed with respect to the body and held in looped configuration by means of a pair of track-supporting wheels and a plurality of body supporting bogie wheels running on the track and the tracks being adapted when driven to propel the vehicle either over land or through the water, said tracks extending for only a portion of the length of the body and being disposed adjacent the opposite end of the body, and auxiliary wheeled supporting means for said body adjacent its streamlined end functioning with said tracks to support the body when the vehicle is propelled over land.

4. An amphibian vehicle comprising in combination, a substantially water-tight vehicle body, said body on one end thereof being streamlined for facilitating passage of the vehicle through the water with this end foremost, a pair of tracks movably disposed on opposite sides of said body and adapted to propel the vehicle either over land or through the water, said tracks extending for only a portion of the length of the body and being disposed adjacent the opposite end of the body, and an auxiliary body supporting unit adjacent the streamlined end of the body and functioning with the tracks to support the body when the vehicle is propelled over land, said auxiliary unit comprising a track movable on a plurality of idler wheels and being disposed in the longitudinal center of the vehicle and partially in a cavity in the bottom of the vehicle provided therefor.

5. An amphibian vehicle comprising in combination, a substantially water-tight vehicle body, said body being tapered on one end thereof whereby to cut the water and facilitate passage of the vehicle through the water with that end foremost, a pair of tracks movably disposed on opposite sides of said body and adapted to propel the vehicle either over land or through the water, each of said tracks having a portion adjacent the opposite end of said body extending upwardly and endwardly of the body whereby the vehicle may mount and pass over raised obstacles when propelled with said opposite end foremost, and a motor in said body adapted for driving said tracks either in a direction for propelling the vehicle through the water with its tapered end foremost or in the opposite direction to propel the vehicle over land with its other end foremost.

6. An amphibian vehicle comprising in combination, a substantially water-tight vehicle body, said body adjacent one end thereof on its bottom slanting upwardly toward said end and toward its sides so that this end of the body is tapered for facilitating passage of the vehicle through the water with this end foremost, a pair of tracks movably disposed on opposite sides of said body and adapted to propel the vehicle either over land or through the water, each of said tracks having a portion adjacent the opposite end of said body extending upwardly and endwardly of the body whereby the vehicle may mount and pass over raised obstacles when propelled with said opposite end foremost, and a motor in said body adapted for driving said tracks either in a direction to propel the vehicle through the water with its tapered end foremost or in the opposite direction to propel the vehicle over land with its other end foremost.

7. An amphibian vehicle comprising in combination, a substantially water-tight vehicle body, said body on one end thereof being streamlined for facilitating passage of the vehicle through the water with this end foremost, a pair of tracks movably disposed on opposite sides of said body and adapted to propel the vehicle either over land or through the water, said tracks extending for only a portion of the length of the body and being disposed adjacent the opposite end of the body, an auxiliary wheeled supporting means for said body adjacent its streamlined end functioning with said tracks to support the body when the vehicle is propelled over land, each of said tracks having a portion on said opposite end of the body extending upwardly and endwardly of the body whereby the vehicle may mount and pass over raised obstacles when propelled with said opposite end foremost, and a motor in said body adapted for driving the tracks either in a direction to propel the vehicle through the water with its streamlined end foremost or in the opposite direction to propel the vehicle over land with its other end foremost.

8. An amphibian vehicle comprising in combination, a substantially water-tight vehicle body, said body on one end thereof being streamlined for facilitating passage of the vehicle through the water with this end foremost, a pair of tracks on opposite sides of said body, said tracks each being movably disposed with respect to the body and held in looped configuration by means of a pair of track-supporting wheels and a plurality of body supporting bogie wheels running on the track and the tracks being adapted when driven to propel the vehicle either over land or through the water, said tracks extending for only a portion of the length of the body and being disposed adjacent the opposite end of the body, each of said tracks having a portion on said opposite end of the body extending upwardly and endwardly of the body whereby the vehicle may mount and pass over raised obstacles when propelled with said opposite end foremost, auxiliary wheeled supporting means for said body adjacent its streamlined end functioning with said tracks to support the body when the vehicle is propelled over land, and a motor in said body adapted for driving said tracks either in a direction to propel the vehicle through the water with its streamlined end foremost or in the opposite direction to propel the vehicle over land with its other end foremost.

9. An amphibian vehicle comprising in combination, a substantially water-tight vehicle body, said body adjacent one end thereof on its bottom slanting upwardly toward said end and toward its sides so that this end of the body is tapered for facilitating passage of the vehicle through the water with this end foremost, a pair of tracks on opposite sides of said body, said tracks each being movably disposed with respect to the body and held in looped configuration by means of a pair of track-supporting wheels and a plurality of body supporting bogie wheels running on the track and the tracks being adapted when driven to propel the vehicle either over land or through the water, said tracks extending for only a portion of the length of the body and being disposed adjacent the opposite end of the body, an auxiliary body supporting unit comprising a track movable on a plurality of idler wheels, said unit being disposed adjacent said tapered body end on the longitudinal center of the body and partially in a cavity provided in the bottom of the body, each of said tracks having a portion adjacent said opposite end of the body extending upwardly and endwardly of the body whereby the vehicle may mount and pass over raised obstacles when propelled with said opposite end foremost, and a motor in said body adapted for driving said tracks either in a direction for propelling the vehicle through the water with said tapered end foremost or in the opposite direction for propelling the vehicle over land with said opposite body end foremost.

10. An amphibian vehicle comprising in combination, a substantially water-tight vehicle body, said body being tapered on one end thereof whereby to cut the water and facilitate passage of the vehicle through the water with that end foremost, a pair of tracks movably disposed on opposite sides of said body and adapted to propel the vehicle either over land or through the water, a motor in said body, and means operatively connecting said motor and said tracks for driving the tracks and including a transmission, said transmission providing one speed ratio for driving the tracks in a direction to propel the vehicle through the water with its tapered body end foremost and providing a plurality of speed ratios for driving the tracks in the opposite direction for propelling the vehicle over land with its opposite body end foremost.

11. An amphibian vehicle comprising in combination, a substantially water-tight vehicle body, said body being tapered on one end whereby to cut the water and facilitate passage of the vehicle through the water with this end foremost, a pair of tracks movably disposed on opposite sides of said body and adapted to propel the vehicle either over land or through the water, each of said tracks having a portion adjacent the opposite end of said body extending upwardly and endwardly of the body whereby the vehicle may mount and pass over raised obstacles when propelled with said opposite end foremost, a motor in said body, and means operatively connecting said motor and said tracks for driving the tracks and including a transmission, said transmission providing one speed ratio for driving the tracks in a direction for propelling the vehicle through the water with its tapered end foremost and providing a plurality of speed ratios for driving the tracks in the opposite direction for propelling the vehicle over land with its said opposite end foremost.

12. An amphibian vehicle comprising in combination, a substantially water-tight vehicle body, said body being tapered on one end whereby to cut the water and facilitate passage of the vehicle through the water with that end foremost, a pair of tracks movably disposed on opposite sides of said body and extending for only a portion of the length of the body and disposed adjacent the opposite end of the body, said tracks being adapted to propel the vehicle either over land or through the water and each track having a portion on said opposite end of the body extending upwardly and endwardly of the body whereby the vehicle may mount and pass over raised obstacles when the vehicle is moving with said opposite end foremost, auxiliary wheeled supporting means for said body adjacent its tapered end functioning with said tracks to support the body when the vehicle is propelled over land, a motor in said body, and means operatively connecting said motor and said tracks for driving said tracks and including a transmission, said transmission providing one ratio for driving the tracks in a direction to propel the vehicle through the water with its tapered end foremost and providing a plurality of ratios for driving the tracks in the opposite direction for propelling the vehicle over land with its said opposite end foremost.

13. An amphibian vehicle comprising, in combination, a substantially water-tight vehicle body having one end shaped to facilitate passage through the water when driven with that end foremost, driving means including a pair of tracks disposed on opposite sides of said vehicle adjacent the end opposite said shaped end and adapted normally and selectively to propel the vehicle through the water with said shaped end foremost and over land with its other end foremost, and a gate at one end of said vehicle, said gate when in closed position forming a portion of the vehicle body and when in open position forming a means of access to the interior of said body.

14. An amphibian vehicle comprising, in combination, a substantially water-tight vehicle body having one end shaped to facilitate passage through the water when driven with that end foremost, means defining a cargo space within said body, a gate positioned above said shaped end and adjacent said cargo space, and driving means including a pair of tracks disposed on opposite sides of said body adjacent the end opposite said shaped end and adapted normally and selectively to propel the vehicle through the water with said shaped end foremost and over land with its other end foremost.

15. An amphibian vehicle comprising, in combination, a substantially water-tight vehicle body having one end tapered to facilitate passage through the water when driven with that end foremost, means defining a cargo space within said body, driving means including a pair of tracks disposed on opposite sides of said body adjacent the end opposite said shaped end and adapted normally and selectively to propel the vehicle through the water with said shaped end foremost and over land with its other end foremost, and a gate adjacent said cargo space and forming in its closed position a wall portion of said vehicle body, said gate being located above said tapered end and being hinged at its own lower edge whereby it is adapted when lowered from its closed position to serve as a ramp leading to or from said cargo space.

BENJAMIN A. SWENNES.